(No Model.)
E. DAY.
Hoisting, Carrying, and Dumping Device.
No. 231,767.          Patented Aug. 31, 1880.
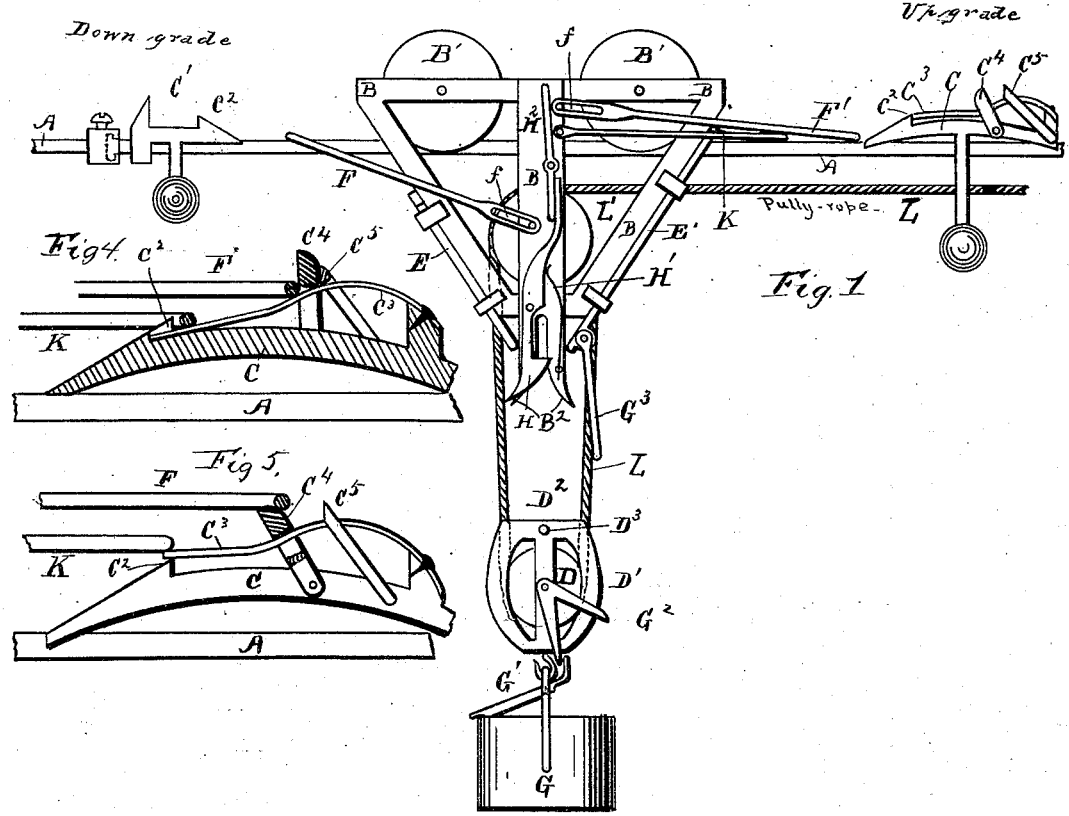
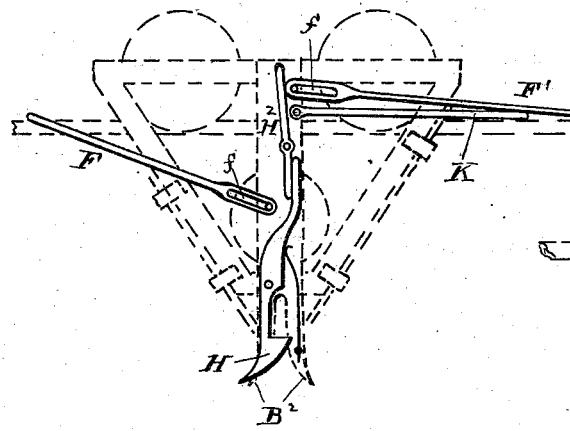
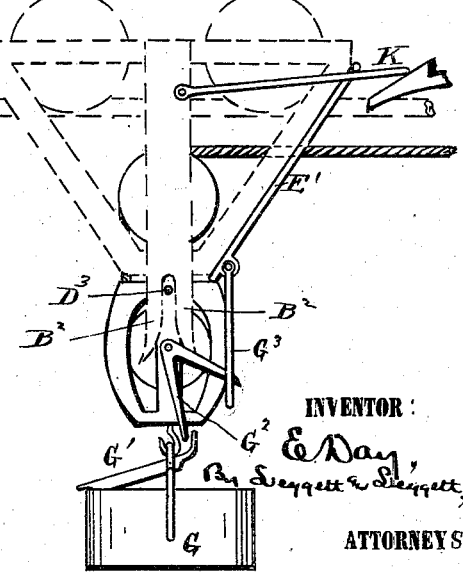
WITNESSES:
INVENTOR: E. Day
By Leggett & Leggett,
ATTORNEYS

UNITED STATES PATENT OFFICE.

ERASTUS DAY, OF CLEVELAND, OHIO, ASSIGNOR TO HIMSELF, ALEXANDER E. BROWN, JAMES M. FERRIS, AND CHARLES D. DAY, OF SAME PLACE, ONE-FOURTH TO EACH.

HOISTING, CARRYING, AND DUMPING DEVICE.

SPECIFICATION forming part of Letters Patent No. 231,767, dated August 31, 1880.

Application filed May 10, 1880. (No model.)

*To all whom it may concern:*

Be it known that I, ERASTUS DAY, of Cleveland, in the county of Cuyahoga and State of Ohio, have invented certain new and useful Improvements in Hoisting, Carrying, and Dumping Devices; and I do hereby declare the following to be a full, clear, and exact description of the invention, such as will enable others skilled in the art to which it pertains to make and use it, reference being had to the accompanying drawings, which form part of this specification.

My invention relates to hoisting, conveying, and dumping mechanism for loading and unloading cars, ships, &c., or for the transportation of weights from one locality to another, and especially to that class of apparatus designed to travel and to carry its load over a suitable tramway, cable, or equivalent; and it consists, first, in a suitable frame or carriage for moving over said cable or tramway, to which carriage are attached the various parts constituting the mechanism of my device; also, in a system of levers and connections, hereinafter specified, whereby the apparatus may be moved and operated in all its functions from a single point and through a single cable or rope; also, in a suitable arrangement of levers, pulleys, and fixed or adjustable stops, whereby the device may be automatically operated to deposit or receive its load from any given point or location; also, in the mechanism hereinafter described, whereby the device may be adjusted to dump or not to dump, as occasion may require; also, in such a construction as to permit of an adjustment whereby the load may be dumped with or without lowering its carrier; also, in the construction of parts hereinafter specified, whereby the fixed or adjustable stops upon the cable or tramway, in connection with said mechanism, constitute the means for automatically operating the device in its various functions.

In the drawings, A represents a cable or tramway, of any suitable character or construction, over which the car or frame B travels.

B' are the traveling wheels of the car or frame B. These wheels are constructed with flanges or grooves suitable for any tramway or cable over which they may move. The car or frame B is constructed of any suitable shape and material, and of any required dimensions, and it is to the frame or car B that the automatic mechanism of my device is principally attached. Permanently or adjustably fixed upon the cable or tramway A are two catch-stops, C C', the particular construction and function of which will hereinafter appear.

C is the up, and C' the down, grade catch-stop.

The two principal functions of my device being that of lifting, lowering, and carrying, and that of dumping, I will separately describe the mechanism whereby said functions are accomplished; and first, the lifting, lowering, and carrying mechanism. The lifting-sheave or pulley-block D' has a flat or shouldered upper surface, $D^2$, which surface, as the block is raised, impinges against the sliding bars E and E', that are movably fixed to the frame B in such a manner as to be permitted a longitudinal movement. The upper ends of the sliding bars E and E' are suitably constructed to impinge against and to lift the sliding latch-links F and F', which fall by their own gravity. The outer ends of the latch-links F and F' extend beyond the frame B, substantially as indicated in the drawings, and are suitably constructed to engage with or hook into the catch-stops C and C'.

The links F F', it will be observed, are adapted to have a longitudinal movement by means of the slot-and-pin arrangement $f$, or any equivalent construction. This longitudinal movement of the links F and F' is provided for the purpose of enabling them to operate in opening the latch mechanism in such a manner as to permit the bucket or carrier G to be lowered from the carriage B.

The latching mechanism may be described as consisting of a latching-lever, H, terminating in a suitable hook or catch, upon which rests a pin or lug, $D^3$, projecting from the block D'. The lever H is retained in its locking position by the action of a suitable spring, H', or a weighted extension, so applied that gravity would act to perform the functions of the said spring H'.

$H^2$ is a lever of the first order, pivoted to the frame B, and designed to act in connection with and as a part of the latching-lever H, where the device is in operation at the up-grade end of the cable or tramway A.

F′, it will be observed, is constructed and located to press against the upper end of the lever H², and thus to force the latching-lever H to its open or unlocked position, in the same manner that the link F would do by pressing against the upper arm of the lever H, the object in both instances being the same—viz., to open or unlock the latch H and to permit the block D′, with its sheave or pulley D, to descend. The lower face of the latch H is beveled in such a manner that the impingement upon it of the pin or lug D³ as the block D′ is lifted will be to open said latch and permit said pin or lug to rest within and be supported by the latching-lever H.

The operation of my device, as thus far specified, is as follows: Supposing that the car B is traveling down grade, as it reaches the stop C′ the latch-link F first rides over and comes into an anchoring position with the hook portion C² of said stop. It is then arrested by the stop and made to push against the lever H, thereby turning it upon its pivot and opening the latch in such a manner as to permit the bucket or carrier G to be lowered; at the same time being securely anchored and held within the stop C′, the weight in the carrier G can be lifted and lowered at pleasure. When, however, the bucket G is drawn up again to the car B the block D′ first comes into confining position with the latch H, and upon being lifted slightly farther impinges against the sliding bar E, which operates to raise the latch-link F until it rides over the anchoring-hook C² of the stop C′ and permits the car to be drawn up grade.

Before showing the operation of the device upon its up-grade movement I desire further to specify the construction of the up-grade stop C, and also to call attention to the combined dumping and up-grade latching-link K, which is pivotally attached to the frame B, and is made of a length suitably shorter than the link F′, substantially as indicated in the drawings.

As regards the stop C, it will be found to differ from the stop C′ in having added a spring, C³, which is fixed at or near the upper end of the stop C, and has its free end resting closely adjacent to the latching or anchoring hook portion C². There is also added to the stop C a swinging piece, C⁴, so constructed as to perform the following functions, viz: to serve as an arrester to the latching-link F′, and as it is driven back by said latching-link to depress the spring C³, and thus expose the anchoring-hook C², in order that the link K may engage therein to retain the carriage B in its up-grade position.

C⁵ is any suitable stop for limiting the backward movement of the piece C⁴, and this may be either in the shape of a structure attached to the stop C, or it may be made a part of the stop C, which it essentially is.

Having thus further referred to the construction of my device, I will describe its operation at the up-grade stop C. The carriage B having reached this stop, the piece C⁴ first impinges against and arrests the latch-link F′. By this impingement the latch H² is opened and the swinging piece C⁴ driven back in such a manner as to depress the spring C³, so that the link K drops into anchoring position within the hook C². In this position the latch H will remain open, and the weight G may be lowered and lifted. Now, when it is desired that the carriage should move down grade, the weight or carrier G is raised until the block D′ impinges against and raises the sliding bar E, which, in its turn, will lift the latch-link F′ until it can ride over and beyond the swinging piece C⁴. Coincident with this operation the latch H is relieved from the pressure of the link F′, and its spring or weight returns it to its locking position, and now, when the carriage is permitted of its own gravity to move down grade, the link F will pull down the swinging piece C⁴, thus permitting the spring C³ to rise and lift the anchoring-link K out from its locking-connection with the piece C⁴, and the car B will now be free to travel toward the stop C′.

The dumping mechanism remains to be described, and it consists of mechanism for automatically releasing the bearing-connection between the bucket or carrier G and its dumping-catch G′, so that said bucket may be permitted to turn upside down and dump by reason of its peculiar attachment to its bail or handle, which is of any suitable description that will cause or permit the carrier G to be upset when disengaged from the dumping-latch G′. This dumping-latch G′ is in the shape of a lever pivotally connected to the bail of the bucket G, and having its short arm bent to engage with the bent lever G², which is pivotally attached to the block D′. This bent lever G² engages with a link, G³, which is pivoted at its upper end to the lower end of the sliding bar E′, and is located in such position as to be engaged by one arm of the bent lever G². The upper end of the sliding bar engages with the link K in such a manner that when said link K is raised it lifts the sliding bar E′, the link G³, and the bent lever G², which operates, by pressing against the short arm of the dumping-latch G′, to free its connection with the bucket G, thus permitting the bucket to dump its load. The bail of the bucket is pivoted a little at one side of the center of the bucket, or the bucket is slightly weighted at one side, or the load of the bucket is disposed so that when the latch G′ is raised clear of the edge of the bucket the latter will dump its load.

The link G³ I prefer should have a swinging or hinged connection with the sliding bar E′, so that when the dumping mechanism is not wanted to be used the link G³ may be swung out of connection with the bent lever G², and retained in its unshipped position by any suitable means, such as swinging it up and fastening it against the frame A or otherwise.

My entire device may be operated by the single rope L. This rope is attached in any suitable manner to the frame B, from whence it passes down around the lifting pulley or sheave D, thence up to a pulley, L', and from thence to any suitable drum for paying it out or taking it in, as necessary.

It will be noticed from the description above given that the bucket or carrier G is always in its elevated and latched position when the car B is traveling over the cable A, either up or down grade; and to insure at all times a proper engagement between the block D' and its pin or lug $D^3$ with the suspending-latch H, I have provided the guides $B^2$. These guides I prefer to spread or flare at their lower ends, substantially in the manner shown, for the evident purpose of insuring an engagement with the pin or lug $D^3$.

Referring again to the stops C C', it is important, if they are to be attached to a cable such as shown at A, that some provision should be had to retain them in an upright position at all times, notwithstanding any twisting or turning of said cable. In order to accomplish this the stops C may be loosely connected with said cable, and so constructed that their center of gravity shall fall below the cable, which will manifestly operate to retain them upright under all circumstances.

When thus constructed it will be well to have a swivel-connection between the stops C or C' and any clamping mechanism whereby they may be securely fixed at any desired point along the cable A. By throwing the link F out of operative position, as would be the case if it were tilted upward and there retained, the automatic dumping function of my device is called into operation without lowering the load at the up-grade stop C, for it will easily be seen that when thus adjusted the link K, as it rides up upon the beveled nose of the stop C, will draw up the bar E and, through the link-and-lever connections already specified, dump the bucket G without the necessity of lowering it.

The mechanism above described as being connected with the frame or car B, and as shown in Fig. 1 of the drawings, is preferably duplicated upon both sides of said frame, although for some purposes it may be sufficient to provide but one side of said frame with the mechanism referred to.

I do not limit myself to the exact construction of all the parts as I have herein specified them. For instance, the block D', instead of having a flat top and shaped like a horseshoe, as indicated, may be of any shape, so long as it is provided with bearing-surfaces for lifting the bars E and E', and so long as it has the pin or lug $D^3$ or its equivalent. Likewise may the latch and lever mechanism herein specified be varied in construction without any departure from my invention, which has no reference to any specific dimensions or conformation of parts.

In the drawings, Figure 1 is a side elevation of a device constructed according to my invention. Fig. 2 is a similar view of the same device, showing in solid lines the dumping mechanism; Fig. 3, a view of said device, showing in solid lines the automatic latching mechanism; and Figs. 4 and 5 show in detail the up-grade stop C in different stages of its operation.

What I claim is—

1. The combination, with a single latch, H, pivoted to a fixed support, a pulley-block having a flat upper surface for opening the latch when raised, and a spring or weight for retaining the latch in its latching position, of a pivoted link and a sliding rod for automatically releasing the link when the pulley-block is raised, substantially as set forth.

2. The combination, with a bucket or carrier, G, of the dumping-latch $G^2$ and the dumping lever or link K, with suitable connections between said link and dumping-latch, whereby the bucket G will be dumped by lifting or raising the link or lever K, substantially as and for the purpose shown.

3. The combination, with the links or levers F F', of the connecting or intermediate mechanism for opening or unlocking the latch H through a longitudinal movement of said links or levers F or F', substantially as and for the purpose shown.

4. The combination of the link or lever K, sliding bar E', link $G^3$, lever $G^2$, and dumping-latch G', substantially as and for the purpose shown.

5. The stop C, having a bevel or slanting nose or front portion, in combination with the dumping-lever K, substantially as and for the purpose shown.

6. The stop C, provided with a spring, $C^3$, and swinging piece $C^4$, substantially as and for the purpose shown.

7. The combination, with link F', adapted to have an oscillating and an endwise movement, of the link K and stop C, substantially as set forth.

In testimony whereof I have signed my name to this specification in the presence of two subscribing witnesses.

ERASTUS DAY.

Witnesses:
   JNO. CROWELL, Jr.,
   WILLARD FRACKER.